US007457769B2

(12) United States Patent
Goren et al.

(10) Patent No.: US 7,457,769 B2
(45) Date of Patent: Nov. 25, 2008

(54) METHODS AND APPARATUS FOR AN AUCTION SYSTEM WITH INTERACTIVE BIDDING

(75) Inventors: William Goren, Arlington, MA (US); Joshua Kanner, Cambridge, MA (US); Olga Raskina, Cambridge, MA (US); Rina Scheur, Lexington, MA (US)

(73) Assignee: Emptoris, Inc., Burlington, MA (US)

( * ) Notice: Subject to any disclaimer, the term of this patent is extended or adjusted under 35 U.S.C. 154(b) by 805 days.

(21) Appl. No.: 10/831,969

(22) Filed: Apr. 26, 2004

(65) Prior Publication Data

US 2005/0240507 A1  Oct. 27, 2005

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

| | | | | |
|---|---|---|---|---|
| 5,615,109 | A | 3/1997 | Eder | 705/8 |
| 5,890,138 | A | 3/1999 | Godin et al. | 705/26 |
| 6,012,045 | A | 1/2000 | Barzilai et al. | 705/37 |
| 6,058,379 | A | 5/2000 | Odom et al. | 705/37 |
| 6,260,024 | B1 | 7/2001 | Shkedy | 705/37 |
| 6,285,989 | B1 | 9/2001 | Shoham | 705/37 |
| 6,366,891 | B1 | 4/2002 | Feinberg | 705/37 |
| 6,415,270 | B1 | 7/2002 | Rackson et al. | 705/37 |
| 6,449,601 | B1 | 9/2002 | Friedland et al. | 705/37 |
| 6,584,451 | B1 | 6/2003 | Shoham et al. | 705/37 |
| 6,598,026 | B1 * | 7/2003 | Ojha et al. | 705/26 |
| 6,606,603 | B1 | 8/2003 | Joseph et al. | 705/26 |
| 6,631,356 | B1 | 10/2003 | Van Horn et al. | 705/26 |
| 6,647,373 | B1 | 11/2003 | Carlton-Foss | 705/37 |
| 6,871,191 | B1 | 3/2005 | Kinney et al. | 705/37 |
| 7,010,511 | B1 | 3/2006 | Kinney, Jr. et al. | |
| 2001/0032170 | A1 | 10/2001 | Sheth | |
| 2001/0039528 | A1 * | 11/2001 | Atkinson et al. | 705/37 |
| 2001/0049634 | A1 | 12/2001 | Stewart | 705/26 |
| 2002/0026429 | A1 | 2/2002 | Lostis et al. | 705/80 |
| 2002/0065764 | A1 * | 5/2002 | Brodersen et al. | 705/37 |

(Continued)

FOREIGN PATENT DOCUMENTS

EP  1111529 A2 *  6/2001

(Continued)

OTHER PUBLICATIONS

Anon., "Northern Seeks Lowest Bid in Reverse Auction," Gas Daily, vol. 10, No. 93, May 14, 1993.*

(Continued)

*Primary Examiner*—Nicholas D Rosen
(74) *Attorney, Agent, or Firm*—Goodwin Procter LLP

(57) ABSTRACT

Prospective suppliers competing in an auction format to fulfill a requisition receive assistance in responding to the requisition over a computer network. A plurality of bids responsive to the requisition are received from at least one prospective supplier. At least one initial winning bid is selected from the received bids that at least partially satisfies the requisition. Using the received plurality of bids, at least one proposed bid is determined that, if adopted by a prospective supplier, would constitute a new winning bid. The proposed bid is made available to at least one prospective supplier that had not previously submitted a winning bid.

42 Claims, 11 Drawing Sheets

U.S. PATENT DOCUMENTS

| | | | |
|---|---|---|---|
| 2002/0103746 A1 | 8/2002 | Moffett, Jr. | 705/37 |
| 2002/0111897 A1* | 8/2002 | Davis | 705/37 |
| 2002/0143692 A1 | 10/2002 | Heimermann et al. | |
| 2002/0147674 A1* | 10/2002 | Gillman | 705/37 |
| 2002/0165813 A1* | 11/2002 | Lee | 705/37 |
| 2002/0165814 A1* | 11/2002 | Lee et al. | 705/37 |
| 2003/0004784 A1 | 1/2003 | Li et al. | |
| 2003/0004850 A1 | 1/2003 | Li et al. | |
| 2003/0028473 A1 | 2/2003 | Eso et al. | |
| 2003/0028475 A1 | 2/2003 | Boutilier et al. | 705/37 |
| 2003/0033236 A1 | 2/2003 | Davenport et al. | |
| 2003/0041014 A1 | 2/2003 | Grey et al. | 705/37 |
| 2003/0088494 A1 | 5/2003 | Lee | |
| 2003/0195835 A1 | 10/2003 | Sandholm et al. | 705/37 |
| 2004/0010461 A1 | 1/2004 | Boutilier | 705/37 |
| 2004/0039680 A1* | 2/2004 | Horch et al. | 705/37 |
| 2004/0059664 A1 | 3/2004 | Suri et al. | 705/37 |
| 2004/0059665 A1 | 3/2004 | Suri et al. | 705/37 |
| 2005/0044032 A1* | 2/2005 | Lee et al. | 705/37 |

FOREIGN PATENT DOCUMENTS

WO     WO-03034187 A2 *   4/2003

OTHER PUBLICATIONS

Anon., "B2eMarkets Wins GSA Reverse Auction Contract; Government-Wide Acquisition Contract for Software and Services," PR Newswire, pDCTH00215082002, Aug. 15, 2002.*

Jeremie Gallien, "Optimization-Based Auctions and Stochastic Assembly Replenishment Policies For Industrial Procurement", PhD Thesis in Operations Research, Massachusetts Institute of Technology, Jun. 2000.

First Office Action, U.S. Appl. No. 09/664,226, Sep. 26, 2003, pp. 1-7.

Second Office Action, U.S. Appl. No. 09/664,226, Jul. 7, 2004, pp. 1-37.

C. Bornhovd, M. Cilia, C. Liebig, and A. Buchmann; "An Infrastructure for Meta-Auctions"; IEEE; Jun. 8-9, 2000; pp. 1-10.

Jasmin, Lynda C. Office Action for U.S. Appl. No. 10/081,411, mailed Jun. 1, 2005, pp. 1-7.

Colbert, Ella. Office Action for U.S. Appl. No. 09/664,226, mailed Jan. 11, 2005, pp. 1-23.

Colbert, Ella. Office Action for U.S. Appl. No. 09/664,226, mailed Sep. 12, 2005, pp. 1-16.

Ba et al. "Optimal Investment in Knowledge Within a Firm Using a Market Mechanism" Management Science, vol. 47, Issue 9, Sep. 2001, pp. 1203-1219.

Bakos "The Emerging Role of Electronic Marketplaces on the Internet" Communications of the ACM archive, vol. 41, Issue 8, Aug. 1998, pp. 35-42.

Emiliani, M.L. "Business-to-Business Online Auctions: Key Issues for Purchasing Process Improvement" Supply Chain Management, vol. 5, Issue 4, 2000, pp. 176-186.

Examiner's Answer to Appeal Brief in related U.S. Appl. No. 09/664,226, mailed Jul. 10, 2007, 19 pages.

Examiner's Answer to Appeal Brief in related U.S. Appl. No. 09/664,226, mailed Mar. 21, 2007, 21 pages.

Examiner's Answer to Appeal Brief in related U.S. Appl. No, 09/664,226, mailed Sep. 19, 2006, 17 pages.

Final Office Action in related U.S. Appl. No. 10/081,411, mailed Feb. 26, 2007, 7 pages.

Final Office Action in related U.S. Appl. No. 10/081,411, mailed Nov. 16, 2005, 7 pages.

Office Action in related U.S. Appl. No. 09/999,670, mailed Nov. 22, 2005, 22 pages.

Office Action in related U.S. Appl. No. 10/081,411, mailed Apr. 20, 2006, 6 pages.

Segev et al. "Optimal Design of Internet-Based Auctions" Information Technology and Management, vol. 2, Issue 2, Apr. 2001, pp. 121-163.

\* cited by examiner

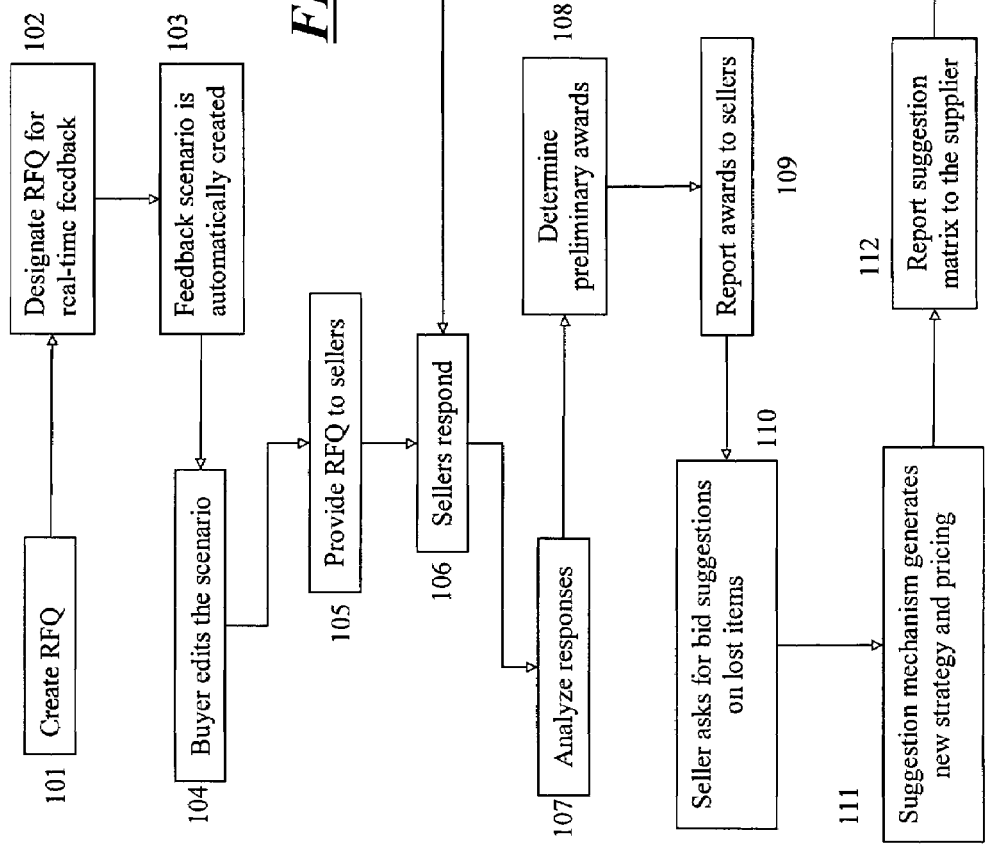

Emptoris - Microsoft Internet Explorer

*Emptoris*

Bid Suggestion Matrix

Bids

? Help

| Item Name | Bid Strategy | Buyer's Desired Quantity | Your price | Your one time charge | Your bid quantity | Quantity you are winning | Suggested next bid (PPU) |
|---|---|---|---|---|---|---|---|
| ☐ WhoMovedMyCheese? | Simple | 100 | | USD 0.00 | | | USD 15.56 |

Submit

Select All ☐

Close

Emptoris

Bid Suggestion Matrix
Bids

| Item Name | Bid Strategy | Buyer's Desired Quantity | Your price | Your one time charge | Your bid quantity | Quantity you are winning | Suggested next bid (PPU) | Select All |
|---|---|---|---|---|---|---|---|---|
| ☐ WhoMovedMyCheese? | Multiple | | | | | | | |
| | Simple | 100 | | USD 0.00 | | | USD 14.00 | |
| ☐ | Bundle | | USD 0.00 | USD 0.00 | 1 | | | |
| ☐ GettingToYes | | 100 | | USD 0.00 | | | USD 13.30 | |
| ☐ OwnYourOwnCorporation | | 100 | | USD 0.00 | | | USD 13.30 | |

Submit  Close

FIG. 4

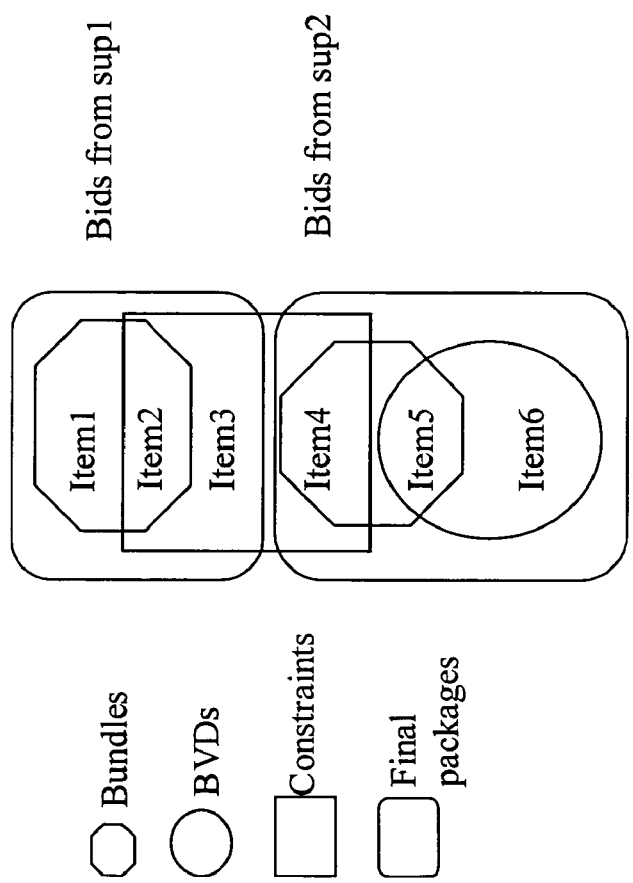

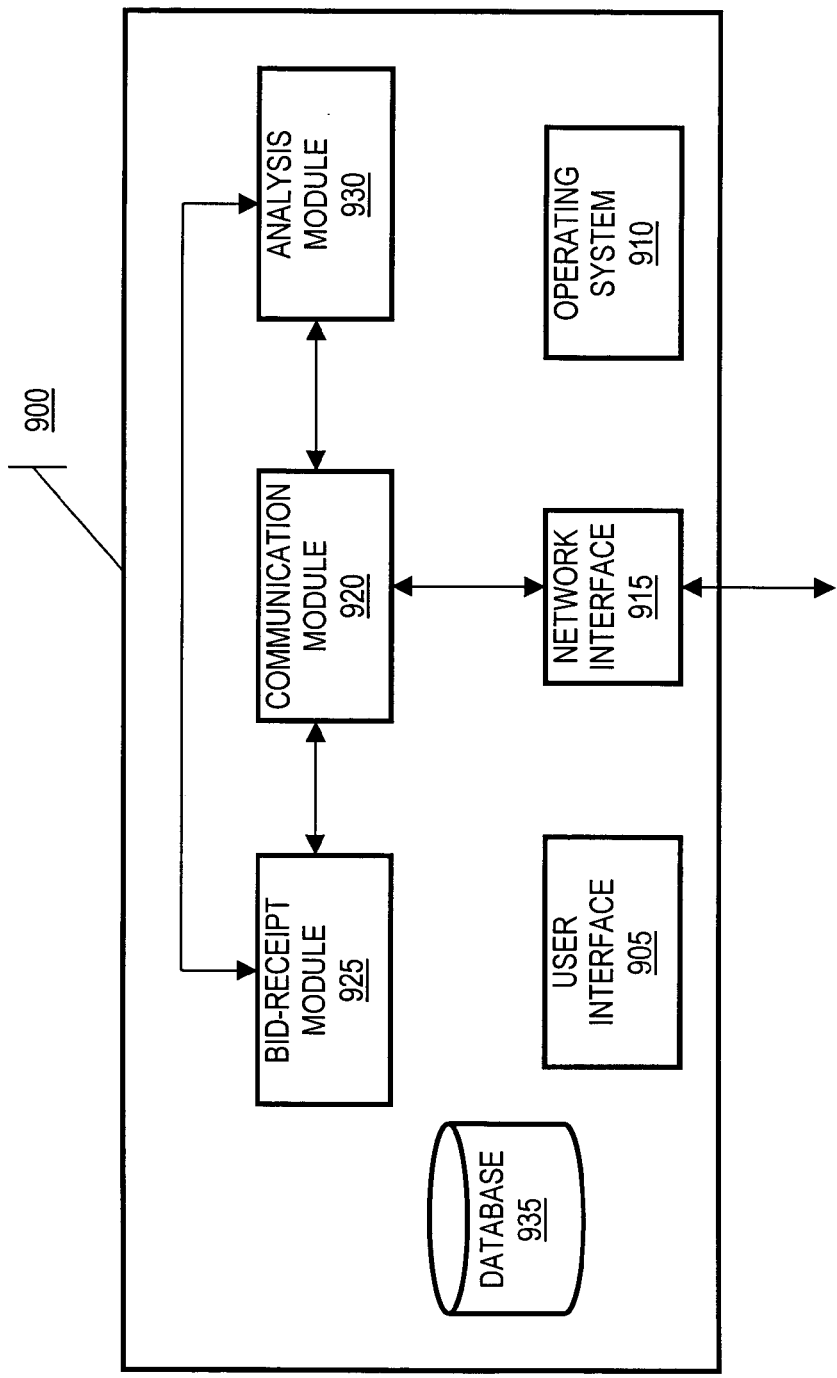

METHODS AND APPARATUS FOR AN AUCTION SYSTEM WITH INTERACTIVE BIDDING

FIELD OF THE INVENTION

This invention relates to the field of strategic sourcing and, in particular, to the management of on-line auctions.

BACKGROUND OF THE INVENTION

In the course of operations, businesses decide from whom they will obtain the various goods and services they require. In manufacturing, raw materials for a product that are to be processed or assembled must be replaced when exhausted if additional products are to be manufactured. Similarly, a service business often consumes supplies in the process of delivering services to its customers that must be replaced if the services are to continue. Supplies may be tangible goods, for example iron and coke used to make steel, or they may be intangible services, for example collection services for collecting delinquent payments. Therefore, throughout this specification, the term "item" is used to refer to both goods and services.

Currently, a buyer seeking to acquire one or more items may create a reverse auction by distributing a "request-for-quotation" (hereinafter "RFQ") to prospective suppliers. The RFQ lists at least the items the buyer desires to purchase. The RFQ may also contain additional information concerning the proposed transaction, such as the minimum or maximum quantities of a particular desired item or items, delivery dates for particular items, or a required quality level for an item. The RFQ can thus be viewed as a collection of constraints imposed by the buyer that describe a proposed transaction. In response to the RFQ, the prospective suppliers submit bids that are offers to enter into a contract with the buyer on specified terms. These bids typically include prices and may include other additional proposed terms. Accordingly, the response can be viewed as a collection of constraints imposed by the prospective supplier on the proposed transaction.

To the extent that the constraints imposed by the buyer and the constraints imposed by a particular supplier are both satisfied, a transaction between the buyer and the particular supplier is possible. In a typical auction, there will be numerous suppliers for which this is true. The buyer must then choose which of those suppliers are to be awarded the bid. The optimal combination of suppliers, together with the list of items to be ordered from each supplier, is referred to as an "optimal award schedule."

Where price is the buyer's sole concern, and all bids can yield a unit price-per-item, the process of determining an optimal award schedule is simple: one selects the supplier offering the lowest price-per-item. If the buyer requires additional quantities of that item when that supplier's supply of the item is exhausted, the buyer then selects the supplier having the next lowest price-per-item. This process continues until the buyer's constraint on the quantity of the item has been met.

However, modern business-to-business transactions are far from that simple. For example, a supplier's price for an item can depend on the quantity of the item purchased. Or, the supplier may bid one price for a bundle of disparate items, in which case it is unclear how the buyer should allocate this price among the items. In addition, other less clearly quantifiable factors must often be considered. For example, the quality of goods, the reputation of the supplier for reliability, or the supplier's solvency may require evaluation. The buyer may also have internally generated policies, or business rules, that further constrain the choice of which suppliers can be awarded which bids.

The complexity of compiling a quantitatively justifiable schedule of optimal awards given all the foregoing constraints is daunting even when the choice is limited to a few suppliers bidding on a limited number of items. As a result, decision-makers often rely on what is euphemistically termed "heuristic reasoning" when awarding bids to suppliers. That decisions of such importance are based on what amounts to educated guesswork is alarming, particularly in an era in which computational tools are so widely available. Therefore, a need exists for computational tools for the compilation of a quantitatively justifiable schedule of optimal awards given specified constraints.

SUMMARY OF THE INVENTION

The present invention relates to methods and apparatus for an auction system with interactive bidding functionality. In brief overview, the invention allows suppliers to create multiple bids in a "creative" format (defined below) in a real-time online negotiation. As a result, suppliers can offer creative pricing while protecting their margins and satisfying buyer constraints. The invention also provides suppliers with at least one automatically generated creative bid. The suggested bid may be generated such that, if accepted by the prospective seller, it would become a winning bid. Providing proposed winning bids encourages suppliers to utilize the creative bid format and thus creates more opportunities for buyers to gain price savings during an online negotiation. The invention may operate in an iterative manner in a multi-round auction: receiving bids, evaluating bids, suggesting new bids, and receiving revised bids until one or more concluding criteria are satisfied.

In one aspect, the present invention provides a computer-implemented method to assist prospective suppliers with responding to an issued requisition over a computer network. A plurality of bids responsive to the requisition are received from at least one prospective supplier. At least one initial winning bid that at least partially satisfies the requisition is selected from the received bids. Using the received plurality of bids, at least one proposed bid is determined that, if adopted by a prospective supplier, would constitute a new winning bid. The proposed bid is made available to at least one prospective supplier that had not previously submitted a winning bid.

In one embodiment, the initial winning bid or bids are determined using price criteria; in another embodiment, non-price criteria are utilized instead or in addition. The initial winning bid or bids may be selected so that they optimally satisfy the issued requisition. In a typical embodiment, the interactions with the prospective sellers occur in real-time, i.e., such that the receipt of bids, determination of winning bids, and determination and provision of proposed bids occurs during the time period in which the prospective sellers are interacting with the system. In one embodiment, the determination of the initial winning bid or bids uses, in part, mixed integer calculations.

In a further embodiment, the initial winning bid or bids are communicated to each prospective supplier having originated at least one of the initial winning bids. In yet another embodiment, information indicating that a received bid or bids did not qualify as an initial winning bid is communicated to their respective prospective suppliers. The bids received may be bundled bids, business volume discount bids, volume discount bids for an item, or simple bids.

In still another embodiment, the availability of a new proposed bid is communicated to at least one prospective seller. The prospective seller or sellers may select a second bid from the proposed bids and provide it in lieu of their initial bid. The second bid is evaluated to determine whether it is a winning bid and, in one embodiment, the fact that the second bid is a winning bid is communicated to the prospective supplier originating the second bid.

Additionally, the received bids may be reviewed to determine those bids that do not qualify as a winning bid in light of the received second bids. When an initial winning bid no longer qualifies as a winning bid in light of one or more received second bids, that fact may also be communicated to the supplier in accord with the principles of the present invention.

In another aspect, the present invention provides a computer useable medium having computer readable code embodied therein to assist prospective suppliers with responding to an issued requisition over a computer network. The code in the medium includes computer readable code for causing a computer to receive a plurality of bids responsive to the requisition from at least one prospective supplier. The code in the medium also includes computer readable code for causing a computer to determine at least one initial winning bid selected from the received bids that at least partially satisfies the requisition. The code in the medium further includes computer readable code for causing a computer to determine at least one proposed bid using the received plurality of bids that, if adopted by a prospective supplier, would constitute a new winning bid. The code in the medium also includes computer readable code for causing a computer to make the proposed bid or bids available to at least one prospective supplier who had not previously submitted an initial winning bid.

In one embodiment, the computer readable code for causing a computer to determine the initial winning bid or bids utilizes price criteria; in another embodiment, non-price criteria are utilized instead or in addition. The computer readable code for causing a computer to determine the initial winning bid or bids may determine the bid or bids so that they optimally satisfy the issued requisition. In a typical embodiment, the computer readable code causes the computer to interact with prospective sellers in real-time, i.e., such that the receipt of bids, determination of winning bids, and determination and provision of proposed bids occurs during the time period in which the prospective sellers are interacting with the system. In one embodiment, the computer readable code for causing a computer to determine an initial winning bid or bids uses, in part, mixed integer calculations.

In a further embodiment, the medium also includes computer readable code for causing a computer to communicate the initial winning bid or bids to each prospective supplier having originated at least one of the initial winning bids. In yet another embodiment, the medium also includes computer readable code for causing a computer to communicate information indicating that a received bid or bids did not qualify as an initial winning bid to their respective prospective suppliers.

In still another embodiment, the medium also includes computer readable code for causing a computer to communicate the availability of a new proposed bid to at least one prospective seller. The medium may also include computer readable code for causing a computer to receive a second bid from the proposed bids from the prospective seller or sellers in lieu of their initial bid. The medium includes computer readable code for causing a computer to evaluate the second bid to determine whether it is a winning bid using, in part, mixed integer calculations, and, in one embodiment, the medium also includes computer readable code for causing a computer to communicate the fact that the second bid is a winning bid to the prospective supplier originating the second bid.

Additionally, the medium may also include computer readable code for causing a computer to review the received bids to determine those bids that do not qualify as a winning bid in light of the received second bids. The medium may further include computer readable code for causing a computer to communicate with a supplier when an initial winning bid no longer qualifies as a winning bid in light of one or more received second bids.

In yet another aspect, the present invention provides a computer-implemented method to assist prospective suppliers with responding to an issued requisition for a desired quantity of at least one item over a computer network. A plurality of bids responsive to the requisition are received from at least one prospective supplier. Those items in the requisition for which the desired quantity is not fully satisfied by the received plurality of bids are identified. The effective prices for the identified items are calculated, and decremented prices for the identified items are calculated using a predetermined amount. A proposed bid is created using the decremented prices and provided to at least one prospective supplier who did not have an initial winning bid. The predetermined amount may be expressed as a dollar value or as a specified percentage.

In still another aspect, the present invention provides an auction server having a network interface, a communication module, a bid receipt module, and an analysis module. The communication module issues a requisition over a computer network via the network interface in accordance with criteria provided by a buyer. The bid receipt module receives a plurality of bids responsive to the requisition over the computer network via the network interface. The analysis module determines at least one initial winning bid selected from the received bids that at least partially satisfies the requisition and at least one proposed bid using the received plurality of bids that, if adopted, would constitute a new winning bid. The communication module is configured to make the proposed bid or bids available over the computer network via the interface to at least one prospective supplier that did not submit a winning bid.

In one embodiment, the analysis module determines the initial winning bid or bids using price criteria; in another embodiment, non-price criteria are utilized instead or in addition. The analysis module may select the initial winning bid or bids so that they optimally satisfy the issued requisition. In one embodiment, the analysis module determines the initial winning bid or bids using, in part, mixed integer calculations. The analysis module may be configured to handle bundled bids, business volume discounts, volume discount bids for an item, or simple bids. The proposed bid or bids are typically generated and provided to a supplier during an interaction session between the supplier and the server.

In a further embodiment, the communication module is configured to communicate the initial winning bid or bids to each prospective supplier having at least one initial winning bid. The communication module may be additionally configured to communicate those received bids that did not qualify as an initial winning bid to their respective suppliers. In still another embodiment, the communication module is configured to communicate the availability of a new proposed bid to at least one prospective supplier.

In another embodiment, the bid-receipt module is configured to receive at least one second bid selected from the proposed bid or bids by at least one prospective supplier. The analysis module is further configured to determine at least one subsequent winning bid in response to the received second bid or bids. The communication module may be further configured to communicate to the prospective supplier whether the received second bid is a new winning bid. The communication module may also be configured to communicate with the supplier associated with an initial winning bid to inform them that an initial winning bid is no longer a winning bid. Optionally, the analysis module may be configured to identify received bids that do not qualify as a winning bid.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which:

FIG. 1A is a workflow diagram of the steps followed by an embodiment of the present invention in the course of operating the interactive reverse auction system;

FIG. 2 illustrates an exemplary web page presenting a supplier with a matrix of suggested bids in accord with one embodiment of the present invention;

FIG. 3 illustrates a web page viewed by a supplier showing a suggestion matrix suggesting a new bundle bid in accord with one embodiment of the invention;

FIG. 4 depicts a web page in accord with one embodiment of the present invention that is viewed by a supplier and presents a matrix of suggested bids incorporating a plurality of new bidding strategies;

FIG. 8 is a diagram presenting an example of the package creation strategy of FIG. 7; and FIG. 9 schematically illustrates a representative server architecture implementing the invention.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

Definitions

Figure 1B:
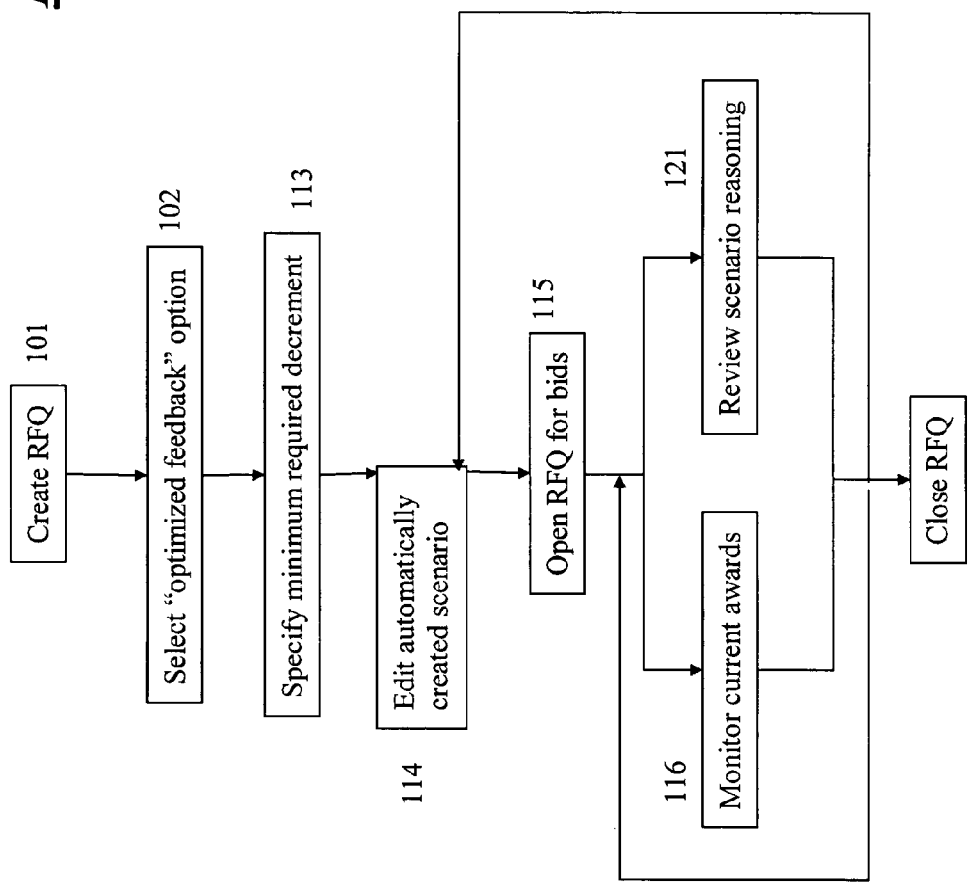
FIG. 1B presents the buyer-side workflow of FIG. 1A in more detail.

RFQ: A "request-for-quotation" promulgated by a buyer to prospective suppliers when the buyer opens a reverse auction.

Buyer Business Rule: Constraints imposed by the buyer in determining an optimal award schedule. These constraints may be price-based or non-price based, for example, product quality, delivery schedule requirements, etc. To facilitate further discussion, the rules discussed herein are limited to:

Supplier Count: Buyer business rules that limit the number of suppliers who will be selected to supply an item or a set of items.

Capacity: Buyer business rules that limit the number of units of an item or a set of items that will be supplied by any one supplier or a selected set of suppliers.

Cost: Buyer business rules that limit the monetary value of business awarded to any one supplier or a selected set of suppliers.

Supplier Cost: Buyer business rules that add cost of doing business with any one supplier or a selected set of suppliers.

It is to be understood that nothing in the present invention limits buyer business rules to these four items and, in fact, the scope of the present invention explicitly encompasses other price and non-price criteria.

Bid Filter: Buyer business rules that include or exclude bids based on the attributes in the bid.

Scenario: A set of buyer business rules imposed by the buyer.

Business volume discount (BVD): A supplier pricing strategy in which the supplier offers a discount on a set of items depending on the number of items ordered or the dollar amount spent on the items.

Bundle bid: A bid in which a supplier proposes to supply two or more different items as a package with a discount price.

Sub-bid of a bundle bid: An individual bid on a single item in the bundle.

PPU: price per unit.

Overview

In brief overview, a buyer seeking to acquire one or more items creates a reverse auction by distributing an RFQ to prospective suppliers utilizing an embodiment of the present invention. The RFQ enables a particular format of online negotiation referred to herein as a "creative negotiation format." The creative negotiation format is an interactive process that permits a supplier to see his award quantities change in response to the submission of his own bids and bids from his competitors.

The RFQ lists at least the items the buyer desires to purchase, and may also contain additional information concerning the proposed transaction, such as the minimum or maximum quantities of a particular desired item or items, delivery dates for particular items, or a required quality level for an item.

In response to the RFQ, the prospective suppliers submit bids that are offers to enter into a contract with the buyer on specified terms, typically including prices and other additional proposed terms. These bids can be simple bids, i.e., a bid to supply a particular item at a particular price, or they can be more sophisticated in structure, such as a bundle bid, a business volume discount, or a volume discount bid, i.e., a bid to supply a particular item with a price that varies according to the quantity of item supplied.

Upon receipt of these bids, a routine is run that evaluates the received bids and allocates amounts of goods desired under the RFQ to prospective suppliers in response to their bids. A bid that causes a prospective supplier to receive some allocation of goods from the buyer is a winning bid, while its converse is a losing bid. In various embodiments, the routine may be an optimization routine that computes an optimal allocation of desired goods among prospective suppliers.

After receiving these bids, embodiments of the present invention provide suppliers with real-time information concerning the quantity they are winning in the auction by updating a graphical user interface (GUI). For example, this information can be displayed in an "amount winning" column which shows winning amounts in green and losing amounts in red. This is desirable, as real-time automated feedback may appear more trustworthy to suppliers than manual feedback from a representative of the buyer.

Embodiments of the present invention also provide prospective suppliers with specific creative bid suggestions by updating a user interface for the suppliers called the "bid suggestion matrix." The bid suggestion matrix shows the suppliers the bids they need to place to win the buyer's business, bids that potentially displace part or all of the combination of currently winning bids. The supplier can then automatically submit these new suggested bids as their own by taking appropriate action with the interface, such as clicking a button. Together, these displays allow suppliers to see the results of a real-time optimization and then use those results to update their own bids.

The bid suggestion matrix also provides feedback to the suppliers if additional optimizations have been run that have created new bid suggestions for the suppliers. For example, it may flash an indicator that 'new bid suggestions are available' to indicate to a supplier that they should look for these new suggestions.

The receipt of new bids from prospective suppliers, whether they are those suggested by the invention or derived independently by the suppliers, trigger a new round of evaluation. Again, amounts of goods desired under the RFQ are allocated to prospective suppliers in response to their bids and the bids of the other suppliers. The bid suggestion matrices for the other suppliers are updated to present them with bid suggestions that would enable them to take the lead in the auction, displacing the bids of other suppliers. The process continues iteratively, until no further new bids are received, at which point the allocation among suppliers is decided and the creative negotiation auction ends.

System Workflow

As illustrated in FIG. 1A, auctions conducted in a creative negotiation format in accord with the present invention operate as a specialized workflow within an online RFQ. A buyer creates an RFQ (Step 101) and designates it for real-time feedback (Step 102) to support the creative negotiation format.

With real-time feedback enabled, a special scenario is automatically created (Step 103). Normally, awards to prospective suppliers are selected through scenario analysis, with the buyer initiating the selection of awards. However, the creative negotiation format lets a supplier initiate award selection by submitting or canceling a bid. In one embodiment, the scenario includes special configured optimization capabilities to remove the possibilities for buyers to create 'counter-intuitive' constraints.

The buyer can edit the automatically-created scenario by adding business rules that will be applied in making the award selection (Step 104). The buyer then invites prospective suppliers to respond to the RFQ (Step 105). The suppliers respond by accepting the RFQ and placing their bids (Step 106).

Embodiments of the present invention analyze the received bids (Step 107) and determine which bidding suppliers will be awarded contracts to supply items based on their bids and the bids of their competing prospective suppliers (Step 108). Suppliers may view the amounts they have currently been awarded (Step 109), and ask for proposed bids that, if adopted, would enable them to win additional contracts to supply items based on the terms of the proposed bid (Step 110). The system generates a proposed bid (Step 111) and reports it to the supplier (Step 112) in real-time, i.e., during an interactive session between the system and the supplier. The supplier reviews the suggested bid or bids and responds by accepting the suggestion and proposing it as his own bid, rejecting the suggestion and proposing another bid, or by not placing a bid at all (Step 106). The process continues until the RFQ is closed, for example, when prospective sellers cease to make further bids or when all of the items sought by the buyer in the RFQ are provided by prospective sellers under terms that square with the buyer's scenario.

Buyer Workflow

FIG. 1B illustrates the workflow of the system from the buyer's perspective. The buyer creates an RFQ (Step 101) and designates it for real-time feedback (Step 102) as discussed above. The buyer also specifies a minimum decrement value (Step 113) that is used to calculate the price per unit of a suggested bid.

The RFQ can include several bid fields that a prospective seller can address when submitting a bid. Each bid field has a data type (e.g., text, Boolean, currency, formula, integer, real number, date, message, etc.) and is defined to correspond to some real-world quantity which the buyer values (product quality, delivery schedule constraints, sanitation, etc.).

In particular, the formula data type specifies a bid field whose value itself depends at least in part on the values of other specified bid fields. To the extent that the buyer has specified a minimum decrement value that is a price, the use of a formula data field allows the mapping of non-price criteria in the bid to a price value that may then be used for the computation of suggested bids, as discussed in greater detail below. Alternately, the algorithms described below may operate directly on non-price numeric fields.

The buyer can edit the automatically generated real-time feedback scenario (Step 114) and then open the RFQ for bids (Step 115). While the RFQ is open, the buyer monitors the current awards to prospective suppliers (Step 116) or reviews the scenario reasoning (Step 121). By closing the RFQ, the buyer stops the bidding process.

Supplier Workflow

Figure 1C:
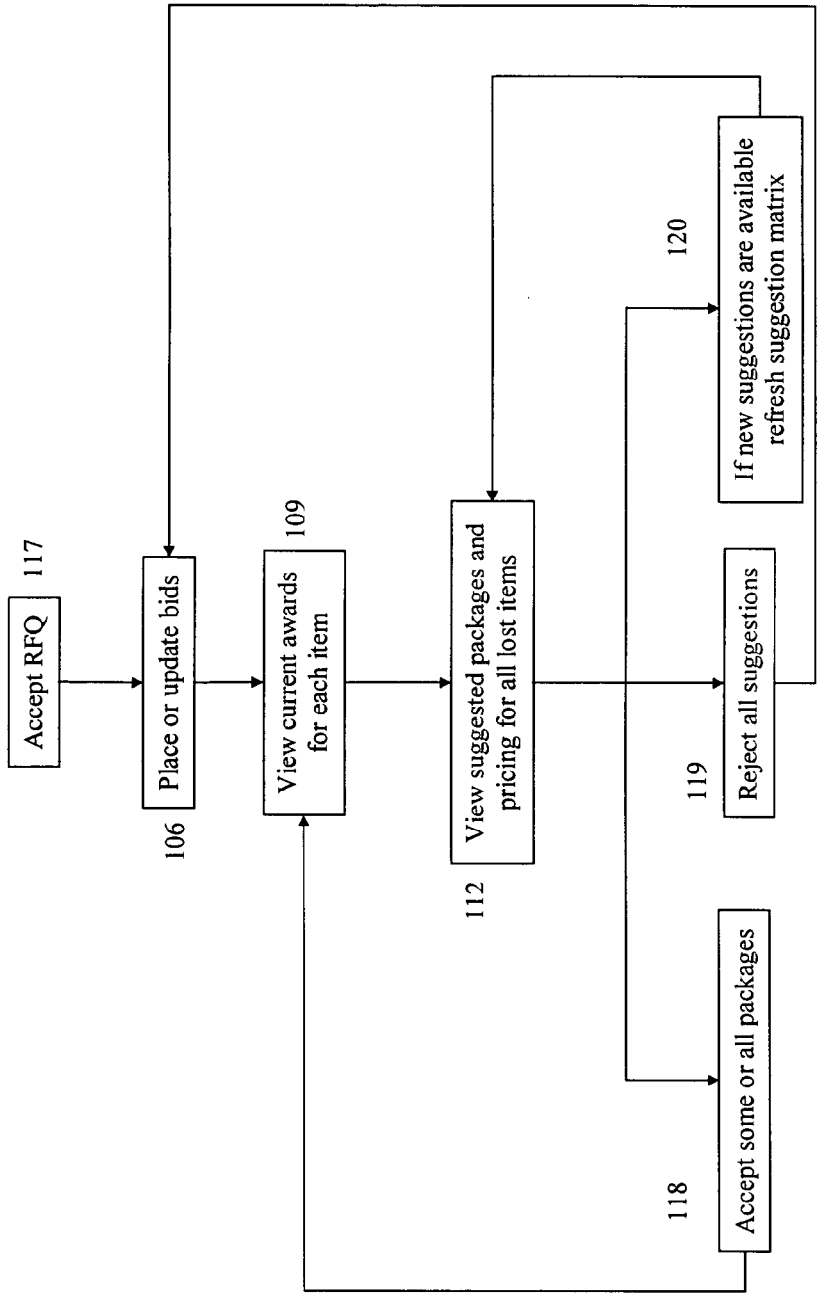
FIG. 1C depicts the supplier-side workflow of FIG. 1A in more detail.

FIG. 1C illustrates the workflow of the system from a supplier's perspective. The supplier begins their participation in the creative negotiation format by accepting the RFQ invitation (Step 117).

The supplier places an initial bid on an item (Step 106), before participating in the creative negotiation format for that item. The receipt of initial bids from prospective suppliers causes the system to generate a preliminary award selection, with particular bids from prospective suppliers winning the right to provide some or all of a requested item on the terms in the bid.

The supplier may view the current schedule of successful and unsuccessful bids, summarizing the awards that he has received (Step 109). Using the functionality provided by embodiments of the present invention, the supplier may also request bid suggestions from the system for those items that were not won (Step 112). These suggested bids include at least a bid price (i.e., including both one-time charge and price per unit data) and a bid strategy to create a package of bids that are submitted together.

In response, the supplier can submit the suggested bids for some or all of the packages (Step 118) or reject all of the suggestions (Step 119). Assuming the supplier rejects all of the suggested bids, the supplier can still continue to participate in the RFQ process by creating and submitting their own bids (simple bids, package bids, etc.). As the process continues, the supplier may receive a notification that updated bid suggestions are available and may reload the bid suggestion matrix to display these new suggestions (Step 120).

Creating an Auction in Creative Negotiation Format

As mentioned above, a buyer creates a creative negotiation format auction by configuring rules for the RFQ using a GUI or equivalent mechanism. For example, a GUI may include a prompt such as "Provide optimization feedback to suppliers?" with a Yes/No toggle. Selecting the "Yes" option enables the creative negotiation format and prompts the user for additional information concerning the auction. For example, the buyer may specify the minimum percent of dollar amount by which a prospective supplier must beat a currently winning bid in order to displace a presently winning bid (i.e., the percent decrement for optimization feedback). Selecting the "No" option disables the creative negotiation format.

Once the user enters all of the additional information concerning the creative negotiation format auction, the system creates a scenario composed of buyer business rules that the buyer may edit as desired (Steps 103, 104)

Bid Suggestion Matrix

A supplier bids on an auction item (Step 106) using a conventional bid screen. The supplier participates in the creative negotiation format by selecting a user interface element (e.g., a button or hyperlink) that displays a bid suggestion matrix (Step 112).

An exemplary bid suggestion matrix is displayed in FIG. 2. The goods to be supplied are copies of the book entitled, "Who Moved My Cheese?" As illustrated, the example matrix presents a supplier with data concerning the current state of the auction, in particular, the bid price and strategy needed to win the award of an auction item. Specifically, the matrix shows the winning "Bid Strategy," the "Buyer's Desired Quantity," "Your price," "Your one time charge," "Your bid quantity," "Quantity you are winning," and "Suggested next bid (PPU)."

In the example of FIG. 2, a simple bid strategy with a price per unit of US$15.56 will win an award of the auction item. This is guaranteed by the bid suggestion algorithm, so long as no other competing bids have been submitted between the supplier's initial view and subsequent acceptance of the suggested bid. The bidder can submit this bid suggestion as a new bid (Step 106) by selecting the bid using the checkbox, and clicking the "Submit" button.

If a competing bid is submitted or deleted while the user is viewing the Bid Suggestion Matrix screen, and the bid suggestion algorithm determines a new suggested bid or bids as a result of that change, then the screen of FIG. 2 is automatically updated with a notification to inform the seller that new suggested bids are available.

Figure 3:
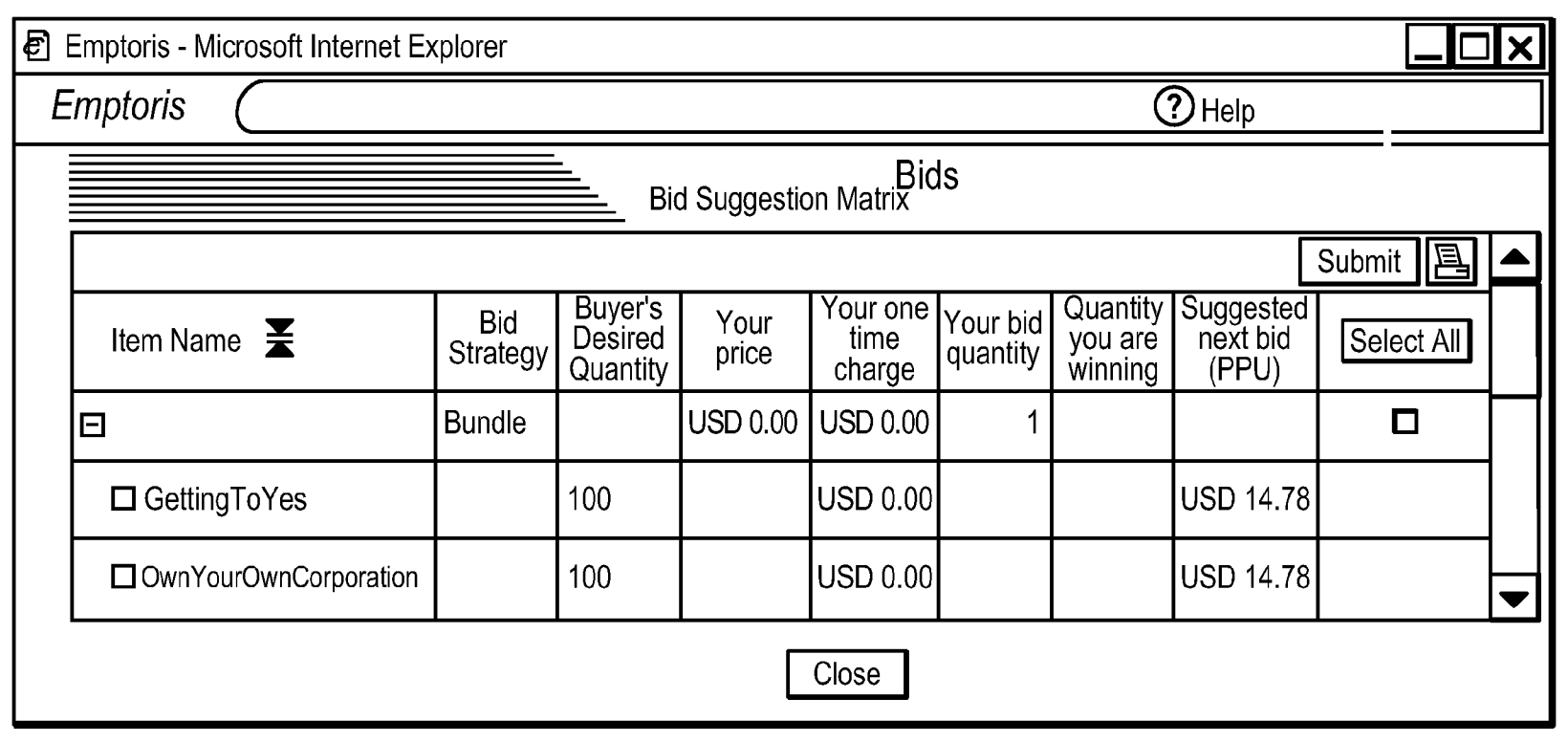

Auctions in creative negotiation format also support bid strategies with complexity exceeding that of simple bid schemes. For example, when a buyer creates an auction for a number of required items, selection of the bid suggestion matrix may present the buyer with bids that bundle several of the required items together, as illustrated in FIG. 3.

Note that in this embodiment the suggestion algorithm only provides suggested bids for those items for which the supplier has either no award or only a partial award. For example, the bid suggestion matrix of FIG. 3 only contains suggestions for two auction items, namely, the books entitled, "Getting to Yes" and "Own Your Own Corporation." In this example, the suggested bid is a bundle strategy, i.e., the current winning bid has bundled the two items together. The bidder must bid this as a bundle to be guaranteed a winning award. The bidder can select the single checkbox for the entire bundle and click the "Submit", button, to generate the bundle bid automatically.

A bid strategy of even greater complexity is shown in FIG. 4. Here the matrix is suggesting a multiple-bid strategy for a winning bid. All three items must be bid together to win because the winning bidder has used a bid strategy that may have included a business volume discount, or taken advantage of a buyer's business constraint that bind these items together. The multiple bid strategy in this case includes a simple bid and a bundle bid. In the general case, a multiple bid strategy can include any number of simple bids, bundle bids, and volume discount bids. There is only a single checkbox for this multiple bid strategy; the user can select this checkbox and click the "Submit" button to automatically generate an appropriate bid(s). Note that these generated bids do not replicate the exact strategy of the current winning bidder (e.g., the same business volume discount), but rather an equivalent strategy that does not reveal the particular business practices of the competing bidder.

Bid Analysis

When bids are received, they are evaluated to determine the appropriate award schedule using the buyer's defined scenario. This process is iterative, as additional rounds of bids will prompt the recomputation of the award schedule.

With the defined scenario, an optimal award schedule may be determined by minimizing an objective function subject to the buyer and seller constraints. This is achieved in a conventional manner using API calls to a collection of optimization subroutines sold under the trademark CPLEX. In one embodiment, the objective function is:

$$\sum_{s \in S} \left\{ \sum_{b(s) \in B(s)} [f_i^{b(s)} X^{b(s)} + C_i^{b(s)} x_i^{b(s)}] + \right.$$

$$\sum_{d(s) \in D(s)} f^{d(s)} \sum_{i \in d(s)} Z^{d(s)} + C_i^{d(s)} Z_i^{d(s)} \right] \right\} + \sum_{k \in K} \sum_{i \in I} W_{k,i}$$

$$\left\{ \sum_{s \in S} \left( \frac{100 - r_{k,i}^s}{100} \right) \left[ \sum_{b(s) \in B(s)} C_i^{b(s)} x_i^{b(s)} + \sum_{d(s) \in D(s)} C_i^{d(s)} Z_i^{d(s)} \right] \right\}$$

For each supplier, the optimization takes into account the price offered by that supplier and a penalty associated with the supplier's performance in any buyer-specified performance attributes, where:

$$c_i^{d(s)} = c^{d(s)} \left[ \frac{c_i^b \cdot a_i^{d(s)}}{\sum_{i \in d(s)} c_i^b \cdot a_i^{d(s)}} \right]$$

— parameters associated with supplier constraints (and therefore constant over all scenarios);
$w_{k,i}$ — the weight assigned by the buyer to performance attribute k for item i;
$s \in S$ — a summation over all suppliers s;
$b(s) \in B(S)$ — a summation over all conventional bids b(s) made by supplier s;
$d(s) \in D(s)$ — a summation over all bundled bids d(s) made by supplier s;
$i \in d(s)$ — a summation over all items i that are included in a bundled bid d(s);
$k \in K$ — a summation over all performance attributes k; and
$i \in I$ — a summation over all items i.

Essentially, the objective function is evaluated by summing a price term that depends on a supplier's bid and a penalty term that depends on non-price factors associated with that supplier, such as the supplier's performance attributes, and a measure of how important the buyer considers those performance attributes. The price term is the sum of that supplier's conventional bids for an item and the price attributable to that item from any bundled bids that include that item; in either case, the price incorporates both a unit cost per item and a fixed cost for accepting that bid. The penalty term, which may vary between scenarios, is formed by weighting the supplier's offer price for an item by a quantity that depends on the values of all the performance attributes associated with that item and with that supplier. This result is then weighted again by a quantity indicative of how important those performance attributes are to the buyer.

To minimize the objective function, four sets of decision variables are varied:

$X^{b(s)}$—is a binary variable that is set to 1 if the conventional bid b(s) of supplier s is to be awarded, either in whole or in part. Otherwise, it is set to 0;

$Z^{d(s)}$—is a binary variable that is set to 1 if the bundled bid d(s) of supplier s is to be awarded. Otherwise, it is set to 0;

$x_i^{b(s)}$—is the number of units of item i to be purchased from supplier s under the terms of conventional bid b(s); and $z_i^{d(s)}$—is the number of units of item i to be purchased from supplier s under the terms of bundled bid d(s). This is given by the product of the number of bundles and the number of items per bundle, or $z^{d(s)} \cdot a_i^{d(s)}$ where $z^{d(s)}$ is the number of bundles d(s) to be purchased from suppliers.

Since the objective function includes binary decision variables, the minimization is carried out using conventional integer programming techniques. The objective function is minimized subject to constraints (1)-(19), as discussed below.

$$\sum_{s \in S} \left( \sum_{b(s) \in B(s)} x_i^{b(s)} + \sum_{d(s) \in D(s)} z_i^{d(s)} \right) \leq Q_i^u \ \forall \ i \in I \quad (1)$$

$$\sum_{s \in S} \left( \sum_{b(s) \in B(s)} x_i^{b(s)} + \sum_{d(s) \in D(s)} z_i^{d(s)} \right) \geq Q_i^l \ \forall \ i \in I \quad (2)$$

Constraints (1) and (2) ensure that the number of units of each item, when summed across all suppliers, is within the limits defined by the buyer. Constraints (1) and (2) have a first term for conventional bids and a second term for bundled bids. In constraint (1), $Q_i^u$ represents the maximum number of units of item i required by the buyer. In constraint (2), $Q_i^l$ represents the minimum number of units of item i required by the buyer. In constraints (1) and (2), summation is carried out only over those bids that include item i.

$$\sum_{i \in g} \left( \sum_{b(s) \in B(s)} x_i^{b(s)} + \sum_{d(s) \in D(s)} z_i^{d(s)} \right) - Y_g^s M_g \leq 0 \ \begin{array}{l} \forall s \in S \\ \forall g \in G \end{array} \quad (3)$$

$$\sum_{i \in g} \left( \sum_{b(s) \in B(s)} x_i^{b(s)} + \sum_{d(s) \in D(s)} z_i^{d(s)} \right) - Y_g^s \geq 0 \ \begin{array}{l} \forall s \in S \\ \forall g \in G \end{array} \quad (4)$$

$$\sum_{s \in T} Y_g^s \leq \text{Max } Ng^t \ \forall \ g \in G, \forall \ t \in T \quad (5)$$

$$\sum_{s \in T} Y_g^s \geq \text{Min } Ng^t \ \forall \ g \in G, \forall \ i \in T \quad (6)$$

In some cases, a buyer may prefer that several different suppliers participate in the satisfaction of one requisition. For example, in purchasing oil, it may be prudent to select several globally dispersed suppliers to avoid a shortfall caused by local political instability. Conversely, when too many suppliers participate in satisfaction of a requisition, the administrative overhead can become onerous. A buyer may therefore define a business rule that limits the number of suppliers that participate in the satisfaction of a requisition. Constraints (3)-(6) cooperate to enforce limitations related to the number of suppliers selected to supply items. The variable $Y_g^s$ in constraints (3)-(6) is a binary variable whose value is 1 when supplier s is selected to supply at least one item from group g and 0 otherwise. Constraints (3) and (4) correlate values of $Y^{gs}$ with values of $x_i^{b(s)}$ and $z_i^{d(s)}$ for all items i in group g, since if either $x_i^{b(s)}$ and $z_i^{d(s)}$ is positive for at least one item in the group, then $Y_g^s = 1$. Otherwise, $Y_g^s = 0$.

The summations shown in constraints (3) and (4) are over those items belonging to a group g. A group g of items is analogous to a bundle of items, except that a group is defined by the buyer rather than by the supplier. As an example, a buyer for a hotel may specify a requisition for 200 face towels, 100 bath towels, and 150 hand towels. Each face towel, bath towel, or hand towel would be an item. The buyer may then define a group, called "towels," that consists of 450 items, namely all face towels, all bath towels, and all hand towels. The parameter $M_g$ is the maximum number of items from group g that can be supplied by any one supplier.

In constraints (3) and (4), the inner summation is carried out only over those bids that include item i. Continuing the example above, if a buyer were to require that at least two suppliers satisfy the requisition for the group "towels," feasible solutions could cut across items. For example, supplier 1 might supply 100 face towels, 50 bath towels, and 75 hand towels while supplier 2 would supply the remainder. Alternatively, feasible solutions could cut between items. For example, supplier 1 might supply all 200 face towels and supplier 2 would then supply all hand and bath towels.

In other cases, a buyer may prefer to impose constraints on the number of suppliers selected from a cluster of suppliers. For example, a buyer may define a cluster of suppliers in terms of political subdivisions such as states or municipalities. A supplier would then be a member of that cluster if it had a principal place of business within that political subdivision. The buyer might then define a business rule specifying that at least one award be made to a supplier from each political subdivision, or that no more than N awards be made to suppliers from any one political subdivision. Constraints (5) and (6) enforce a business rule specifying a minimum or maximum number of suppliers belonging to a particular cluster that are selected to supply items from a particular group g. A special and limiting case of constraints (5) and (6) is one in which a cluster t includes all suppliers who have submitted bids and a group g represents the entire requisition. In constraints (5) and (6), summation is carried out only over those groups and clusters to which the business rule applies.

In constraints (5) and (6), $\text{Max}(N_g^t)$ represents the maximum number of suppliers from cluster t that can be selected to supply items from group g. Conversely, $\text{Min}(N_g^t)$ represents the minimum number of suppliers from cluster t that can be selected to supply items from group g.

$$\sum_{s \in t} \sum_{i \in g} \left( \sum_{b(s) \in B(s)} x_i^{b(s)} + \sum_{d(s) \in D(s)} z_i^{d(s)} \right) \leq \text{Max } Q_g^t \ \forall \ g \in G, \quad (7)$$

-continued $$\sum_{s \in t} \sum_{i \in g} \left( \sum_{b(s) \in B(s)} x_i^{b(s)} + \sum_{d(s) \in D(s)} z_i^{d(s)} \right) \geq \text{Min } Q_g^t \; \forall \, g \in G, \quad (8)$$

$$\forall \, t \in T$$

$$\forall \, t \in T$$

In still other cases, a buyer may prefer to ensure that a particular supplier or cluster of suppliers supplies a number of items within a specified range. For example, a buyer concerned with prompt delivery of at least N units of an item may group all suppliers within a twenty-mile radius into a single cluster. That buyer could then specify, as a business rule, that at least N units of that item be obtained from suppliers belonging to that cluster. Constraints (7) and (8) are concerned with enforcing a business rule that specifies a minimum and maximum number of items obtained from suppliers belonging to any one cluster. In those constraints, $\text{Max}(Q_g^t)$ represents the maximum number of items from group g that can be awarded to suppliers from cluster t. Conversely, $\text{Min}(Q_g^t)$ represents the minimum number of items from group g that can be awarded to suppliers from cluster t. In constraints (7) and (8), summation is carried out only over those groups and clusters to which the constraints apply.

$$\sum_{s \in t} \sum_{i \in g} \left( \sum_{b(s) \in B(s)} c_i^{b(s)} x_i^{b(s)} + \sum_{d(s) \in D(s)} c_i^{d(s)} z_i^{d(s)} \right) \leq \text{Max } V_g^t \quad (9)$$

$$\forall \, g \in G, \forall \, t \in T$$

$$\sum_{s \in t} \sum_{i \in g} \left( \sum_{b(s) \in B(s)} c_i^{b(s)} x_i^{b(s)} + \sum_{d(s) \in D(s)} c_i^{d(s)} z_i^{d(s)} \right) \geq \text{Min } V_g^t \quad (10)$$

$$\forall \, g \in G, \forall \, t \in T$$

In some cases, a business rule may not limit the number of units of an item but instead limit the dollar value of the transaction. Such a business rule is enforced by constraints (9) and (10), which are identical to constraints (7) and (8) except that each term has been multiplied by the appropriate cost per item ($c_i^{b(s)}$ for conventional bids and $c_i^{d(s)}$ for bundled bids). In constraints (9) and (10), $\text{Max}(V_g^t)$ represents the maximum dollar volume from group g that can be awarded to suppliers from cluster t. Conversely, $\text{Min}(V_g^t)$ represents the minimum dollar volume from group g that can be awarded to suppliers from cluster t. In constraints (9) and (10), summation is carried out only over those groups and clusters to which the constraints apply.

$$z_i^{d(s)} - u_i^{d(s)} Z^{d(s)} \leq 0 \; \forall i \in I, \forall s \in S, \forall b(s) \in B(s) \quad (11)$$

$$z_i^{d(s)} - l_i^{d(s)} Z^{d(s)} \geq 0 \; \forall i \in I, \forall s \in S, \forall b(s) \in B(s) \quad (12)$$

Constraints (11) and (12) serve two purposes. First, these constraints correlate the value of $Z^{d(s)}$ with those of $z_i^{d(s)}$. If a bundled bid d(s) is accepted from supplier s (so that $Z^{d(s)}$ and hence $z_i^{d(s)}$ for all items i in d(s) are positive), then $Z^{d(s)}$ is set to one. Conversely, if $Z^{d(s)}$ is set to zero, then all $z_i^{d(s)}$ must be zero. Secondly, these constraints ensure that the number of units of item i awarded to supplier s is between the range specified by the upper and lower limits $u_i^{d(s)}$ and $l_i^{d(s)}$.

$$X_i^{b(s)} - X^{b(s)} U_i^{b(s)} \leq 0 \; \forall s \in S, \forall b(s) \in B(s) \quad (13)$$

$$X_i^{b(s)} - X^{b(s)} L_i^{b(s)} \geq 0 \; \forall s \in S, \forall b(s) \in B(s) \quad (14)$$

Constraints (13) and (14) in are analogous to constraints (11) and (12) but are applied to conventional bids instead of bundled bids. If a bid b(s) is accepted from supplier s (so that $x_i^{b(s)}$ is positive), then $X^{b(s)}$ is set to one. Conversely, if $X^{b(s)}$ is set to zero, then $x_i^{b(s)}$ must be zero. These constraints then ensure that the number of units of item i awarded to supplier s is between the range specified by the upper and lower limits $U_i^{b(s)}$ and $L_i^{b(s)}$. These limits are specified by the buyer in the course of creating a business rule or by the supplier when specifying the number of items available for sale at a specified price. In constraints (13) and (14), summation is carried out only over those bids that include either a fixed cost or a lower bound on the number of items that can be purchased.

$$0 \leq X_i^{b(s)} \leq U_i^{b(s)} \; \forall s \in S, \forall b(s) \in B(s) \quad (15)$$

Constraint (15) ensures that the amount of item i supplied by supplier s is less than the upper limit $U_i^{b(s)}$. For bids having a lower bound, or for bids in which the supplier has imposed a fixed cost, this constraint is redundant.

$$0 \leq Z_i^{d(s)} \; \forall \, d(s) \in D(s) \quad (16)$$

$$X^{b(s)} = \begin{cases} 0 \\ 1 \end{cases} \forall \, b(s) \in B(s) \quad (17)$$

$$Y_g^s = \begin{cases} 0 \\ 1 \end{cases} \forall \, g \in G, \forall \, s \in S \quad (18)$$

$$Z_g^s = \begin{cases} 0 \\ 1 \end{cases} \forall \, g \in G, \forall \, s \in S \quad (19)$$

Constraint (16) ensures that the amount of item i to be supplied by supplier s on the basis of a bundled bid d(s) is non-negative. Constraints (17)-(19) ensure that the variables $X^{b(s)}$, $Y_g^s$ and $Z^{d(s)}$, all of which are defined above, are binary variables that are constrained to be either zero or one.

First Bid Suggestion Methodology—Price Decrement Approach

Once the initial bids are placed and preliminary awards have been made, any participating supplier can see the amount he is currently winning on every item in the RFQ. If the supplier is not winning the entire quantity of some items, the supplier has the opportunity to receive suggestions for the bids on those items such that if the suggested bids are accepted (and assuming the absence of other changes such as new or updated business rules on the buyer's side, or new bids from other suppliers) then it is guaranteed that the supplier will receive the entire allotment of those items in the bid sought by the buyer.

Figure 5:
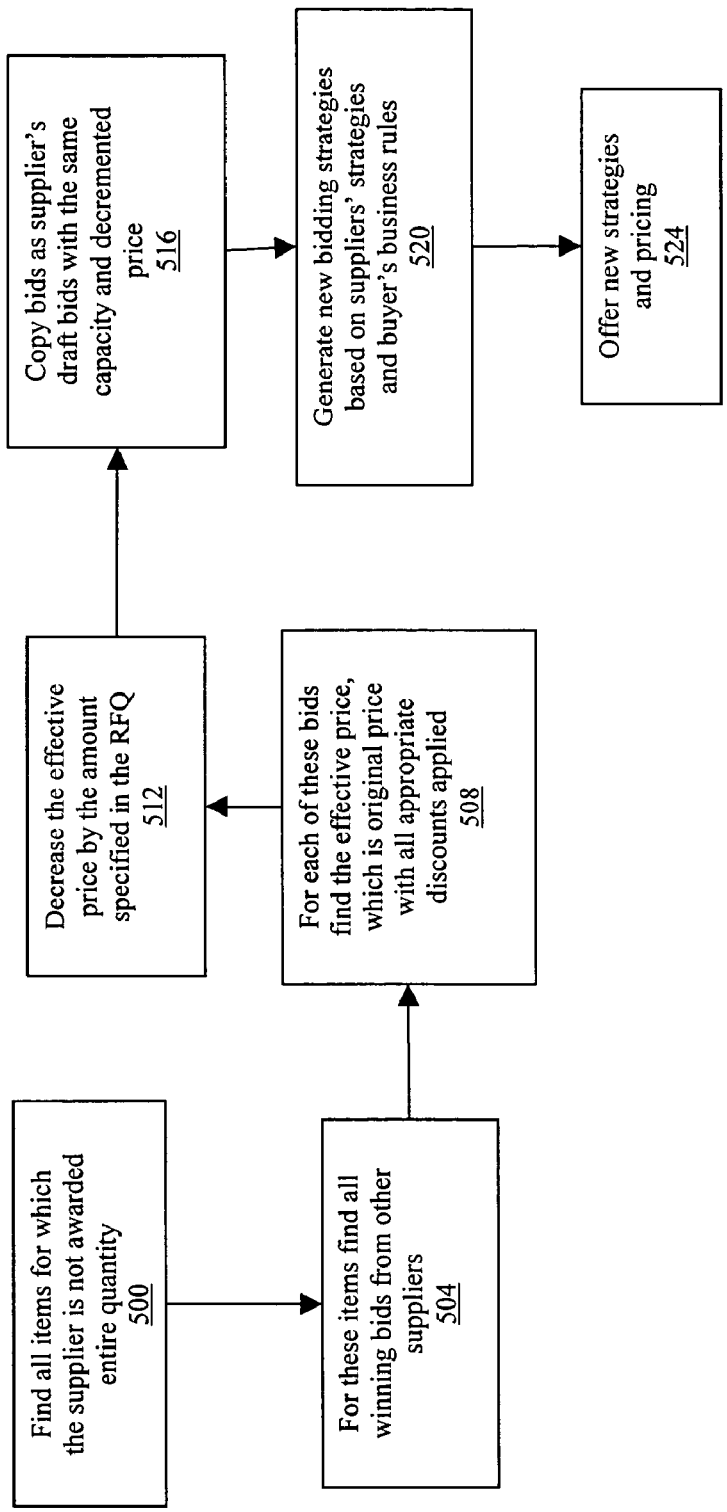
FIG. 5 is a flowchart describing the method for computing a suggested bid for provision to prospective suppliers.

Referring to FIG. 5, the suggestion mechanism first determines all items for which the supplier has no award or has a partial award (Step 500). Next all winning bids on these items from other suppliers are collected and the effective prices are calculated (Step 504). The effective price is what the buyer will have to pay if all currently winning bids are awarded. The price is calculated as the base price for the item with all appropriate business volume discounts, volume discounts, and bundle discounts applied (Step 508). The bids are then copied into the supplier's draft bids with effective price decremented by the buyer-defined percentage (Step 512). The decremented price is the resulting price offered to the supplier.

Figure 6:
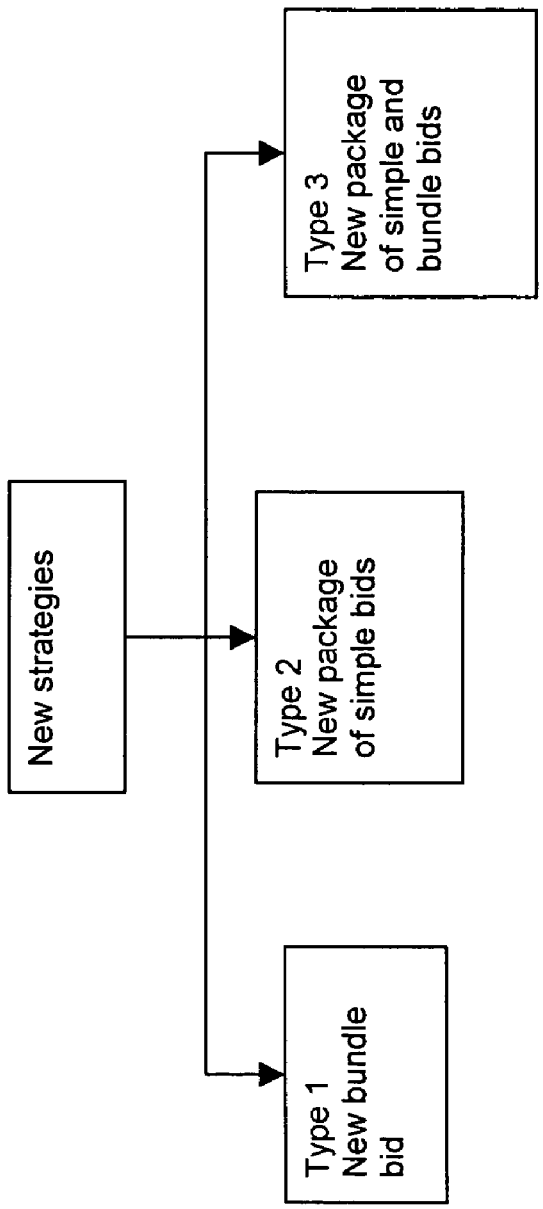
FIG. 6 presents an exemplary set of bidding strategies generated by the suggestion mechanism of FIG. 5.

The final step is to create a bidding strategy that guarantees the preliminary award of the entire quantity of all items in the auction to the supplier in the absence of any changes that affect award distribution (Step 516). FIG. 6 presents a plurality of possible bidding strategies offered by the bid suggestion mechanism: a new bundle bid, a new package of simple bids, and a new package of simple bids and bundle bids. When the presently winning bids are bundle bids, the system suggests a bundle bid with the specified price decrement.

Figure 7:
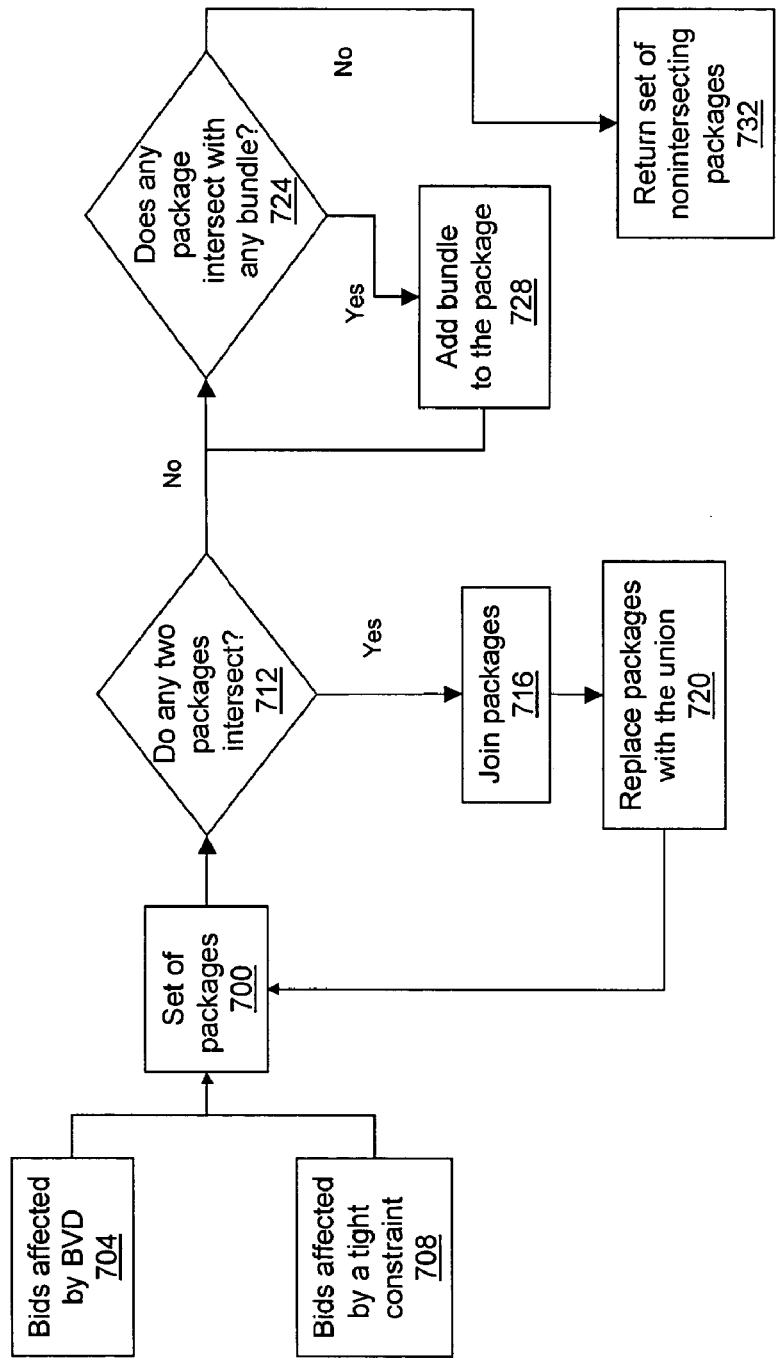
FIG. 7 is a flowchart illustrating the creation of the bidding strategies presented in FIG. 6.

FIG. 7 presents a method for the computation of a new package of bids, whether they are packages of simple bids or packages of simple bids and bundle bids. To facilitate this discussion, certain terminology is used to describe the state of various elements in the bidding process:

A BVD is "active" if it has been applied to at least one currently winning bid.

A bundle bid is "active" if it is currently winning some allocation of requested items from the RFQ.

A business rule is "active" if the corresponding constraint is at the bound. For example a business rule limiting the number of awarded suppliers in the RFQ to be at most three is active if there are currently exactly three awarded suppliers, and inactive if there are two or one winning supplier.

For every supplier, all bids affected by a BVD constitute a "package."

For every supplier, all bids affected by active constraints constitute a "package."

The process begins with an initial set of packages (Step 700) that are formed from the union of other suppliers' active bidding strategies (Step 704) and the buyer's active business rules (Step 708). In general the set of packages is reviewed for intersecting packages and, where intersecting packages are found, they are joined to form a new set of packages, which is reviewed for intersecting packages and so on until no further intersecting packages are found.

Two packages intersect when they contain the same bid or sub-bids of the same bundle bid (Step 712); whenever two packages intersect they are joined into one package (Step 716) and the result replaces the original packages (Step 720). A bundle bid intersects with a package if the package contains at least one sub-bid of the bundle bid (Step 724); whenever a bundle bid intersects with a package, the bundle bid is added to the package (Step 728).

The process is terminated when all packages and bundle bids are nonintersecting (Step 732). These packages are then offered to the supplier as a set of bidding strategies. The acceptance of a package guarantees the award of all items covered by the bids in the package, assuming that no other supplier submits an interim winning bid covering the items in the package.

Again, although this discussion has been focused on price criteria, the use of the formula data type in a bid field allows the mapping of non-price criteria in the bid to a price value that may then be used to generate suggested bids. Alternately, the same type of computations may be performed directly on non-price numeric fields.

Example—Bid Packaging Approach

A buyer has created an RFQ identifying six items (Item1, Item2, Item3, Item4, Item5, and Item 6) each with a desired quantity of 10. The buyer has enabled the creative negotiation format by enabling real-time supplier feedback. Additionally, the buyer has imposed a constraint that at most two suppliers can be awarded Item2, Item3, and Item4.

Initially:

Supplier1 places a bundle bid on Item1 and Item2 and a simple bid on Item3, Item4, Item5, and Item6.

Supplier2 places a bundle bid on Item4 and Item5 and a simple bid on Item6, Item1, Item2, and Item3.

Additionally, Supplier2 has a BVD on Item1, Item2, Item5, and Item6 that states that if at least 15 units of these items are awarded, Supplier2 will give a 15% discount on these items.

With these bids, the initial winning award distribution is:

Supplier1 receives the entire quantity of Item1, Item2, and Item3.

Supplier2 receives the entire quantity of Item4, Item5, and Item6.

Now Supplier3 enters the auction and requests suggested bids for all of the items. The application of the package building process is illustrated in FIG. 8. First, the constraint on the number of suppliers (i.e., at most two suppliers can be awarded Item2, Item3, and Item4) is considered. In the current award schedule, exactly two suppliers have awards on the items specified in the constraint. In this case, the constraint is tight (i.e., active) and the bids from each supplier constitute a package. The result is two packages:

Package1—Bids from Supplier1 on Item2 and Item3

Package2—Bid from Supplier2 on Item4

Supplier2 also has a BVD on Item1, Item2, Item5, and Item6 with the lower limit of 15 items. In the current award schedule, Supplier2 is awarded 20 units of Item5 and Item6 together, which means that this BVD is active and the bids affected by it (i.e., the bids on Item5 and Item6) form another package:

Package3—Bids from Supplier2 on Item5 and Item6.

No more packages can be built at this moment.

Next we examine all eligible package pairs. The bids from Supplier1 only form one package (Package1), which cannot intersect with any other package. However, the bids from Supplier2 form more than one package, so we examine Package2 and Package3. Supplier2 has a bundle bid on Item4 and Item5, which means that these two packages intersect. We eliminate the original Package2 and Package3 and introduce a new Package2':

Package2'—Bids from Supplier2 on Item4, Item5, and Item6.

Package2' is the union of the two original packages, which still contains the bundle explicitly.

Now, Supplier1 has a bundle on Item1 and Item2, and the bid on Item2 belongs to Package1. Therefore, we add this bundle to this package and get new Package1':

Package1'—Bids from Supplier1 on Item1, Item2, and Item3.

There are no more intersecting packages and all of the bids have been examined, so Package1' and Package2' are offered to Supplier3.

Second Bid Suggestion Methodology—Inverse Optimization Approach

Alternatively, suggested bids can be computed with respect to the set of items defined by the supplier in its bid, as opposed to using the set of items defined by the buyer as described above with FIGS. 5-7. This approach also takes into account any combination of buyer business rules and pricing schemes.

As above, the process starts by determining the current set of awards and presenting it to the supplier. The awards are calculated by solving the integer problem:

$$z^* = \text{Minimize } cx \quad (20)$$

Subject to $$Ax \leq b \quad (21)(E1)$$

$$x' \text{ integer} \quad (22)$$

where:

x—the vector of all variables used in the model, e.g., the variables representing the amount awarded to a bid;

c—the vector of all objective coefficients. e.g., the PPU value of a bid, the discount value, or other auxiliary parameters;

A—the matrix of all constraints coefficients of the model;

b—the right-hand side vector;

x'—the subset of variables x that are set to be integral, e.g., the variables taking the value of one if the corresponding bid has any award, any zero otherwise; and z*—the value of the optimal solution, i.e., the total minimum cost of ownership.

Having reviewed the feedback concerning his current position in the auction, the supplier selects a set of items he would like to win. With this selection, the suggestion mechanism attempts to determine a suggested bid that will allow the supplier to win these items. First, the mechanism determines the number of units for each of the items indicated by the supplier by solving the integer problem:

$$\text{Maximize} \sum_{i \in I} s_i \quad (23)$$

$$\text{Subject to} \sum_{b(S) \in B(S)} x_i^{b(S)} \geq 1 + s_i \; \forall \, i \in I \quad (24) \; (E2)$$

and constraints (21), (22)

where:

S—the supplier for which the current suggestion is generated;

I—the set of items specified by this supplier;

$s_i$—the maximum feasible amount over 1 that the supplier can win on item I;

B(S)—set of all bid from supplier S; and $x_i^{b(S)}$—the variable representing the number of units of item i to be purchased from supplier s under the terms of conventional bid b(S).

The summation in the objective function (23) is carried over all items in the set I. The objective is maximized to ensure the maximum award and the constraint (24) guarantees the award of item i to the supplier is at least 1.

The result of solving (E2) is either the number of units of each item in the set that should be awarded to the supplier or an indication that the problem is infeasible. In the latter case, the user is informed that the problem cannot be solved with the current information and it is suggested to expand the set of desired items. Otherwise, the algorithm determines the best award distribution of the remaining items by solving:

$$\text{Maximize } cx \quad (25)$$

$$\text{Subject to} \sum_{b(S) \in B(S)} x_i^{b(S)} \geq Q'_i \; \forall \, i \in I \quad (26) \; (E3)$$

constraints (21), (22)

where:

Cx—the objective function used in the original integer program $Q'_i$—is the constant that is calculates as $Q'_i = 1 + s_i$, where $s_i$ is the optimal solution to (4).

Constraint (26) ensures that the supplier is awarded at least $Q'_i$ units of item i.

The final step is to determine the set of prices for the supplier's bids that will guarantee that the optimal solution for (E3) is also optimal for (E1). If this set of prices exists, it will ensure that if the supplier adopts the set he is guaranteed the award of all items in the set I. This is the set of prices that will be returned to the supplier by the suggestion mechanism.

In order to identify the set of prices, constraint (22) is first removed from the solution of (E1), thus making the problem linear instead of integer (i.e., "relaxing" the solution of (E1)). Then the resulting linear problem is used together with the optimal solution to (E3) as the input data to an inverse optimization problem. A method for solving this problem is described in R. K. Ahuja and J. B. Orlin, Inverse optimization, Operations Research 49 (2001), 771-783 (hereinafter "Ahuja"), which is adopted for the rest of this discussion. The Ahuja approach identifies the minimal modification to the objective function of the linear problem that guarantees that the provided solution is optimal for the linear problem. It is well known that if a solution is optimal for the linear problem it is also optimal for the corresponding integer problem.

The Ahuja approach is used, save that the algorithm is permitted to modify every term of the objective function. For each coefficient in the objective function, the Ahuja algorithm introduces a variable V that represents the amount by which this coefficient is changed. Since we are only looking to adjust the prices of the bids from supplier S on items in I, therefore we are allowed to change only the objective coefficients of the variables corresponding to those bids. We accommodate these requirements by driving all of the variables V corresponding to all other objective coefficients to zero.

More specifically, the Ahuja algorithm solves the problem:

$$\text{Minimize } \|\delta\| \quad (27)$$

Subject to $$yA = (c + \delta)^T \quad (28)$$

$$Dy \leq d \quad (29)$$

where:

A and c—as defined by (20), (21)

δ—the amount by which the objective vector c should be changed y—the vector of dual variables In addition, we impose the following constraint:

$$\delta_i = 0 \; \forall i \notin I_S \quad (30)$$

where $I_S$ is the set of indices of the variables corresponding to bids from supplier S on items in I Consequently, the result of the adapted inverse optimization algorithm will indicate the amounts by which the prices of the bids from supplier S on items in I will have to be changed in order for this supplier to win items I Again, although this discussion has been focused on price criteria, the use of the formula data type in a bid field allows the mapping of non-price criteria in the bid to a price value that may then be used to generate suggested bids. Alternately, the same type of computations may be performed directly on non-price numeric fields.

Example—Inverse Optimization Approach

A buyer has created an RFQ identifying four items, each with a desired quantity of 10. The buyer has enabled the creative negotiation format by enabling real-time supplier feedback. There are three suppliers who accept the invitation to respond to the RFQ, each suppliers having PPU:

|       | Item1 | Item2 | Item3 | Item4 |
|-------|-------|-------|-------|-------|
| Supp1 | $10   | $3    | $ 3   | $ 9   |
| Supp2 | $ 5   | $4    | $10   | $10   |
| Supp3 | $ 8   | $8    | $ 6   | $ 7   |

Supplier2 has a bundle on Item2 and Item3. Additionally, the buyer has imposed a constraint that at most there may be two suppliers for each item. This constraint is modeled as a part of constraint (21) as described in ¶¶[0083], [0084] above.

The initial optimal award distribution is this case is

|       | Item1 | Item2 | Item3 | Item4 |
|-------|-------|-------|-------|-------|
| Supp1 |       | 9     | 10    | 10    |
| Supp2 | 10    | 1     |       |       |
| Supp3 |       |       |       |       | with a total cost of ownership of z*=201. The split award on Item2 is due to the bundling strategy offered by Supplier2.

In response to this initial allocation, Supplier3 asks for suggestions on Item2 and Item3. He also specifies that he is willing to decrease his prices on these items by at most δ=30%. Solving (E4) and (E5), the new award distribution becomes:

|       | Item1 | Item2 | Item3 | Item4 |
|-------|-------|-------|-------|-------|
| Supp1 |       |       |       |       |
| Supp2 | 10    | 1     |       |       |
| Supp3 |       | 9     | 10    | 10    | with the total cost of ownership of z'=238. The actual percentage decrease in the TCO is

δ*=(238−201)/(8*9+6*10)*100%=28%

Accordingly, Supplier3 receives a suggestion to bundle bid on items 2 and 3 and to decrease his prices on Item2 and Item3 by 28%, in which case he would receive the allocation shown (i.e., 9 of Item2 and 10 of Item3). Note that Supplier3 wins all 10 of Item4 since in this particular case we can have only two suppliers with awards and the award to Supplier2 and Supplier3 has the lowest TCO; Supplier3 wins all of Item4 because he is cheaper than Supplier2 on Item4.

Third Bid Suggestion Methodology—Bundling Approach

Another approach for generating suggested bids in accord with the present invention directly addresses buyer constraints limiting the minimum number of selected suppliers that are awarded a selected set of items (lower bound supplier counts constraints), limiting the minimum and maximum number or percentage of units of selected items awarded to selected suppliers (unit capacity constraints), limiting the maximum amount or percent of currency spent on selected items awarded to selected suppliers (currency capacity constraints), and any other constraints. Additionally, this approach provides suppliers with suggested bids on a subset of items that he is not currently winning, as opposed to receiving suggestions on all of the items in the RFQ.

In brief overview, after the supplier has specified the items for which he wishes to take the lead in the auction, the algorithm determines the maximum possible award to this supplier on each of the selected items and computes the prices that the supplier has to bid in order to win these amounts. A new bundle covering the selected items is created and returned as the new suggested bid.

Initially, the current schedule of awards is determined and presented to the supplier by solving the integer problem (E1). From the current schedule, the supplier selects a set of items he would like to win. The suggestion mechanism attempts to determine the new pricing that will allow the supplier to win these items. First, it determines the number of units for each of the items indicated by the supplier that the supplier will be awarded if he accepts the suggestion generated by the suggestion mechanism. Additionally, the mechanism attempts to limit the amount by which the supplier S will have to reduce prices. Both of these criteria are addressed by solving the problem:

$$\text{Maximize} \sum_{i \in I} s_i \quad (31)$$

$$\text{Subject to} \sum_{b(S) \in B(S)} x_i^{b(S)} \geq 1 + s_i \ \forall i \in I \quad (32)\ (E4)$$

$$cx - z* \leq 0.01 * \delta \sum_{i \in I_s} c_i x_i \quad (33)$$

$$\text{constraints} \quad (21), (22)$$

where:

S—the supplier for which the current suggestion is generated

I—the set of items specified by this supplier $s_i$—the maximum feasible amount over 1 that the supplier can win on item i B(S)—set of all bids from supplier S $x_i^{b(S)}$—the variable representing the number of units of item i to be purchased from supplier s under the terms of conventional bid b(S)

$I_S$—the set of indices of the variables corresponding to bids from supplier S on items in I.

z*—the value of the optimal solution of (20).

δ—the maximum percent by which we can suggest supplier S to decrease his prices.

cx—the objective function used in the original integer program

The summation in the objective function is carried over all items in the set I. The objective is maximized to ensure the maximum award and constraint (32) guarantees the award of item i to the suppler S is at least 1. Constraint (33) ensures that the supplier will not have to decrease his prices by more than δ percent. This percent can be defined by the buyer or by the supplier prior to the auction or during the auction.

The result of solving (E4) is either the number of units of each item in the set that should be awarded to the supplier or the indication that the problem is infeasible. In the latter case the result is retained to user with the suggestion to expand the set of desired items. Otherwise the algorithm determines the best award distribution of the remaining items by solving:

$$z' = \text{Minimize } cx \quad (34)$$

$$\text{Subject to } \sum_{b(S) \in B(S)} x_i^{b(S)} \geq Q'_i \, \forall \, i \in I \quad (35) \, (E5)$$

$$\text{constraints} \quad (21), (22)$$

where:
cx—the objective function used in the original integer program
$Q'_i$—is the constant that is calculates as $Q'_{i=}1+s_i$, where $s_i$ is the optimal solution to (E4).
z'—the value of the optimal solution of (E5).

Constraint (27) ensures that the supplier is awarded at least Q units of item i.

Lastly, the mechanism determines the set of prices for the supplier's bids that will guarantee that the optimal solution for (E5) is also optimal for (E1). This set of prices ensures that if the supplier adopts them he is guaranteed the award of all items in the set I, and this is the set of prices that is returned to the supplier as a suggested bid. The calculation of these prices begins with the computation of the actual percent δ* by which supplier S will have to decrease the prices such that:

$$\delta^* = \frac{z' - z^*}{\sum_{i \in I_s} c_i x_i} * 100\% \quad (36)$$

This computed price decrease δ* is applied to the prices of all of the winning bids from supplier S on items I that have been determined through the solution of (E5) and combined into a single bundle, which is offered to the supplier as a suggested bid.

System Architecture

FIG. 9 depicts the internal organization of a server 900 that implements the functions performed by an embodiment of the invention as a series of functional blocks or modules. A user interface module 905 permits the server's operator to interact with and program the server 900. The user interface module 905 also provides a mechanism for prospective suppliers to interact with the server 900 as discussed above, permitting the suppliers to participate in a creative negotiation format auction using, for example, an HTML-based or XML-based interface.

The server's operating system 910 directs the execution of low-level, basic system functions such as memory allocation, file management and inter-module communication. A network interface 915 provides a connection to a computer network, which may be a local-area network ("LAN"), a wide-area network ("WAN"), or the Internet. A communication module 820 communicates with the network interface 915 to transmit digitally encoded data over the connected computer network. A bid-receipt module 925 is in communication with the communication module 920 to receive bids submitted by a prospective supplier and to process the received bids into a format that is suitable for evaluation using the analysis module 930.

In operation, a special job queue is established to run the scenario analysis making the award selection, so that the bid suggestions are available when requested. The job queue is restricted so that only one job is allowed to be in the queue at any one time. If a prospective supplier has just submitted a bid and the queue is empty, a scenario analysis job will be added to the queue and the award selections based on the new bid will be available to the prospective supplier when that analysis job is finished. If the supplier has just submitted a bid and the queue has a job in it, the award selection based on the new bid will be available when the job in the queue is finished because the scenario analysis job already in the queue will access the new bid when it begins to run. There is no need to add another job to the queue when there is already a job in the queue. Without this restriction to the job queue, many redundant award selections would be made, slowing down the response in providing bid suggestions. That is, submission of the first bid initiates the optimization routine; subsequent bids update the optimization routine but do not start another routine.

When a supplier requests a bid suggestion, the suggested bids are constructed based on the latest award selections. While viewing the bid suggestions, the award selections may change due to bids submitted by competitors. In that event, the bid suggestion matrix is automatically updated with a message that new suggestions are available. This message is created through a polling mechanism that periodically checks if new award selections have been made and provides the message when new suggestions are available.

Equivalents

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. The following claims are thus to be read as not only literally including what is set forth by the claims but also to include all equivalents that are insubstantially different, even though not identical in other respects to what is shown and described in the above illustrations.

What is claimed is:

1. A computer-implemented method to assist prospective suppliers with responding to an issued requisition over a computer network, said method comprising:
   receiving, from at least one prospective supplier, a plurality of bids consisting of bids selected from the group consisting of bundled bids, business volume discounts, and volume discount bids responsive to the requisition;
   determining at least one initial winning bid selected from the received bids that at least partially satisfies the requisition;
   determining by a computer at least one proposed bid using the received plurality of bids, the at least one proposed bid including non-price criteria differing from the non-price criteria in the at least one initial winning bid that, if adopted, would constitute a new winning bid; and
   making the at least one proposed bid available to at least one prospective supplier other than a supplier from which an initial winning bid was received.

2. The method of claim 1, wherein the at least one initial winning bid is determined using price criteria.

3. The method of claim 1, wherein the at least one initial winning bid is determined using non-price criteria.

4. The method of claim 1, wherein the at least one initial winning bid optimally satisfies the requisition.

5. The method of claim 1, wherein the interactions with the prospective sellers occur in real-time.

6. The method of claim 1, further comprising communicating the at least one initial winning bid to each prospective supplier having at least one initial winning bid.

7. The method of claim 1, further comprising communicating those received bids not qualifying as an initial winning bid to their suppliers.

8. The method of claim 1, wherein the at least one initial winning bid is determined in part using mixed integer calculations.

9. The method of claim 1, further comprising communicating the availability of a new proposed bid to at least one prospective supplier.

10. The method of claim 1, further comprising receiving, from at least one prospective supplier, a second bid selected from the at least one proposed bid.

11. The method of claim 10, further comprising determining at least one subsequent winning bid in response to the received second bid.

12. The method of claim 11, further comprising communicating to the prospective supplier whether the received second bid is a new winning bid.

13. The method of claim 12, further comprising identifying received bids not qualifying as a winning bid.

14. The method of claim 13, further comprising communicating with the supplier associated with an initial winning bid to inform them that an initial winning bid is no longer a winning bid.

15. A computer useable medium having computer readable code embodied therein to assist prospective suppliers with responding to an issued requisition over a computer network, the code in the medium comprising:

computer readable code for causing a computer to receive, from at least one prospective supplier, a plurality of bids consisting of bids selected from the group consisting of bundled bids, business volume discounts, and volume discount bids responsive to the requisition;

computer readable code for causing a computer to determine at least one initial winning bid selected from the received bids that at least partially satisfies the requisition;

computer readable code for causing a computer to determine at least one proposed bid using the received plurality of bids, the at least one proposed bid including non-price criteria differing from the non-price criteria in the at least one initial winning bid that, if adopted, would constitute a new winning bid; and computer readable code for causing a computer to make the at least one proposed bid available to at least one prospective supplier other than a supplier from which an initial winning bid was received.

16. The medium of claim 15, wherein the computer readable code for causing a computer to determine at least one initial winning bid utilizes price criteria.

17. The medium of claim 15, wherein the computer readable code for causing a computer to determine at least one initial winning bid utilizes non-price criteria.

18. The medium of claim 15, wherein the computer readable code for causing a computer to determine at least one initial winning bid determines a winning bid that optimally satisfies the requisition.

19. The medium of claim 15, wherein the computer readable code causes a computer to interact with prospective suppliers in real-time.

20. The medium of claim 15, further comprising computer readable code for causing a computer to communicate the at least one initial winning bid to each prospective supplier having at least one initial winning bid.

21. The medium of claim 15, further comprising computer readable code for causing a computer to communicate those received bids not qualifying as an initial winning bid to their suppliers.

22. The medium of claim 15, wherein computer readable code for causing a computer to determine at least one initial winning bid utilizes mixed integer calculations.

23. The medium of claim 15, further comprising computer readable code for causing a computer to communicate the availability of a new proposed bid to at least one prospective supplier.

24. The medium of claim 15, further comprising computer readable code for causing a computer to receive, from at least one prospective supplier, a second bid selected from the at least one proposed bid.

25. The medium of claim 24, further comprising computer readable code for causing a computer to determine at least one subsequent winning bid in response to the received second bid.

26. The medium of claim 25, further comprising computer readable code for causing a computer to communicate to the prospective supplier whether the received second bid is a new winning bid.

27. The medium of claim 26, further comprising computer readable code for causing a computer to identify received bids not qualifying as a winning bid.

28. The medium of claim 27, further comprising computer readable code for causing a computer to communicate with the supplier associated with an initial winning bid to inform them that an initial winning bid is no longer a winning bid.

29. An auction server comprising:

a network hardware interface;

a communication module for issuing, in accordance with criteria provided by a buyer, a requisition over a computer network via the network interface;

a bid-receipt module for receiving, over the computer network via the interface, a plurality of bids consisting of bids selected from the group consisting of bundled bids, business volume discounts, and volume discount bids responsive to the requisition;

an analysis module for determining (i) at least one initial winning bid selected from the received bids that at least partially satisfies the requisition, and (ii) at least one proposed bid using the received plurality of bids, the at least one proposed bid including non-price criteria differing from the non-price criteria in the at least one initial winning bid that, if adopted, would constitute a new winning bid, wherein the communication module is configured to make the at least one proposed bid available, over the computer network via the interface, to at least one prospective supplier other than a supplier from which an initial winning bid was received.

30. The server of claim 29, wherein the analysis module determines the at least one initial winning bid using price criteria.

31. The server of claim 29, wherein the analysis module determines the at least one initial winning bid using non-price criteria.

32. The server of claim 29, wherein the at least one initial winning bid determined by the analysis module optimally satisfies the requisition.

33. The server of claim 29, wherein the at least one proposed bid is generated and provided to a supplier during an interaction session between said supplier and the server.

34. The server of claim 29, wherein the communication module is configured to communicate the at least one initial winning bid to each prospective supplier having at least one initial winning bid.

35. The server of claim 29, wherein the communication module is configured to communicate those received bids not qualifying as an initial winning bid to their suppliers.

36. The server of claim 29, wherein the analysis module determines the at least one initial winning bid in part using mixed integer calculations.

37. The server of claim 29, wherein the communication module is configured to communicate availability of a new proposed bid to at least one prospective supplier.

38. The server of claim 29, wherein the bid-receipt module is configured to receive, from at least one prospective supplier, a second bid selected from the at least one proposed bid.

39. The server of claim 38, wherein the analysis module is configured to determine at least one subsequent winning bid in response to the received second bid.

40. The server of claim 39, wherein the communication module is configured to communicate to the prospective supplier whether the received second bid is a new winning bid.

41. The server of claim 40, wherein the analysis module is further configured to identify received bids not qualifying as a winning bid.

42. The server of claim 41, wherein the communication module is configured to communicate with the supplier associated with an initial winning bid to inform them that an initial winning bid is no longer a winning bid.

* * * * *